United States Patent
Kim et al.

(10) Patent No.: US 9,227,583 B2
(45) Date of Patent: Jan. 5, 2016

(54) SHOCK ABSORBING APPARATUS FOR VEHICLE

(71) Applicant: Hyundai Motor Company, Seoul (KR)

(72) Inventors: Hyun Gyung Kim, Whasung-Si (KR); Seung Mok Lee, Whasung-Si (KR); Phil Jung Jeong, Whasung-Si (KR); Dong Eun Cha, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/467,912

(22) Filed: Aug. 25, 2014

(65) Prior Publication Data

US 2015/0175108 A1   Jun. 25, 2015

(30) Foreign Application Priority Data

Dec. 20, 2013   (KR) .......................... 10-2013-0160620

(51) Int. Cl.
*B60R 19/18*   (2006.01)
*B60R 21/0136*   (2006.01)
*B60R 19/12*   (2006.01)

(52) U.S. Cl.
CPC .................. *B60R 19/18* (2013.01); *B60R 19/12* (2013.01); *B60R 21/0136* (2013.01)

(58) Field of Classification Search
CPC ............ F16F 6/00; F16F 6/005; B60R 19/18; B60R 21/0136
USPC ............................................. 293/4, 102, 132
See application file for complete search history.

(56) References Cited

U.S. PATENT DOCUMENTS

| | | | | |
|---|---|---|---|---|
| 3,831,847 A | * | 8/1974 | Serritella | 293/102 |
| 5,971,451 A | * | 10/1999 | Huang | 293/102 |
| 2006/0032715 A1 | * | 2/2006 | Barvosa-Carter et al. | 188/267 |
| 2014/0015180 A1 | * | 1/2014 | Pepka | 267/195 |
| 2015/0001862 A1 | * | 1/2015 | Son | 293/120 |

FOREIGN PATENT DOCUMENTS

| | | | |
|---|---|---|---|
| JP | 5-238336 A | | 9/1993 |
| JP | 05-238336 A | | 9/1993 |
| KR | 10-1998-060238 A | | 10/1998 |
| KR | 1998-061146 U | | 11/1998 |
| KR | 10-0181626 B1 | | 5/1999 |
| KR | 10-2010-0049161 A | | 5/2010 |
| KR | 10-2013-0049698 A | | 5/2013 |

* cited by examiner

*Primary Examiner* — Jason S Morrow
(74) *Attorney, Agent, or Firm* — Morgan, Lewis & Bockius LLP

(57) ABSTRACT

A shock absorbing apparatus for a vehicle may include a first coil provided in a bumper of the vehicle, a second coil provided on a vehicle body and facing the first coil, and a control unit applying voltage to generate a repulsive force between the first and second coils when a change in voltage may be detected by a movement of the first coil in an event of a vehicle collision, wherein an electric current flows between the control unit and the first and second coils.

18 Claims, 2 Drawing Sheets

SHOCK ABSORBING APPARATUS FOR VEHICLE

CROSS REFERENCE TO RELATED APPLICATION

The present application claims priority to Korean Patent Application No. 10-2013-0160620, filed on Dec. 20, 2013, the entire contents of which is incorporated herein for all purposes by this reference.

BACKGROUND OF THE INVENTION

1. Field of the Invention

The present invention relates to shock absorbing apparatuses for vehicles, and, more particularly, to a shock absorbing apparatus for a vehicle, which is configured to generate a repulsive force against a collision in the event of a vehicle collision, thus absorbing shocks.

2. Description of Related Art

A bumper is provided on each of front and rear surfaces of a vehicle to protect internal electronic parts and mitigate shocks acting on a passenger in the event of a vehicle collision. The bumper is generally configured to be bent or easily torn when shocks occur, thus effectively absorbing the shocks.

Such a bumper includes a bumper frame that is coupled to a vehicle body to support the bumper, and a bumper case that is coupled to the bumper frame in such a way as to be exposed to the outside. The bumper can absorb a varying degree of shocks, depending on the material of the bumper frame and the bumper case.

However, if the bumper merely includes the bumper frame and the bumper case as described above, it is difficult to effectively absorb different levels of shocks. For example, if small shocks occur in a vehicle collision, the bumper frame and the bumper case should be easily deformed. However, if the bumper is designed to meet these requirements, the bumper cannot effectively absorb shocks and in addition may be excessively deformed in the case of large shocks.

Therefore, in order to effectively absorb shocks depending on various conditions of collision, an additional shock absorbing device is generally installed in the bumper. In order to solve the above problems, a related art discloses a configuration provided with a shock absorbing beam in which a multi-layered hollow portion is formed.

However, such a conventional configuration is problematic in that it cannot vary the shock absorbing degree depending on a shock level, but has only to absorb shocks when they exceed a predetermined level, so that it cannot effectively cope with various levels of shocks.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shock absorbing apparatus for a vehicle, which is configured to generate a repulsive force in a direction opposite to a direction in which a bumper deforms, depending on a deformed degree of the bumper in the event of a vehicle collision, thus effectively absorbing shocks acting on the bumper, and preventing a vehicle body from being deformed by the shocks.

In an aspect of the present invention, a shock absorbing apparatus for a vehicle, may include a first coil provided in a bumper of the vehicle, a second coil provided on a vehicle body and facing the first coil, and a control unit applying voltage to generate a repulsive force between the first and second coils when a change in voltage is detected by a movement of the first coil in an event of a vehicle collision, wherein an electric current flows between the control unit and the first and second coils.

A bumper-side pipe is provided in the bumper of the vehicle in a longitudinal direction of the bumper, the first coil being wound around the bumper-side pipe.

Vehicle-body-side pipe is provided on the vehicle body and faces the bumper-side pipe, the second coil being wound around the vehicle-body-side pipe.

The bumper-side pipe may include a plurality of bumper-side pipes which are provided on the bumper to be disposed one above the other respectively, and the vehicle-body-side pipe may include a plurality of vehicle-body-side pipes which are provided on the vehicle body to be disposed one above the other respectively.

The first coil and the second coil are wound around the bumper-side pipe and the vehicle-body-side pipe, respectively, in a same direction.

The control unit applies a preset voltage value to the first or second coil, when a voltage change value exceeds a preset change value.

The control unit is provided with map data having the voltage change value as an input value and the voltage value as an output value, thus changing the voltage value depending on a change in the voltage change value.

A first induced electromotive force is generated on the first and second coils as the first coil approaches the second coil in the event of the vehicle collision, and wherein the control unit applies base power to each of the first and second coils to allow the first and second coils to become an electromagnet when the first induced electromotive force is generated.

The control unit is operated to generate a second induced electromotive force on each of the first and second coils as the first coil that is the electromagnet approaches the second coil, the voltage change value being the second induced electromotive force.

A bumper-side bracket is provided on each of opposite ends of the bumper-side pipe to be coupled to the bumper while surrounding the opposite ends of the bumper-side pipe.

A vehicle-body-side bracket is provided on each of opposite ends of the vehicle-body-side pipe to be coupled to the vehicle body while surrounding the opposite ends of the vehicle-body-side pipe.

A vehicle-body-side bracket is provided on each of opposite ends of the vehicle-body-side pipe to be coupled to the vehicle body while covering the opposite ends of the vehicle-body-side pipe on a front of the vehicle-body-side pipe.

The shock absorbing apparatus may further include a vehicle-body fixing bracket provided between the vehicle-body-side bracket and the vehicle body in such a way to be coupled at a first end thereof to the vehicle-body-side bracket and at a second end thereof to the vehicle body.

The vehicle-body fixing bracket is made of a metal material, and the vehicle-body-side bracket is made of an insulating material.

The vehicle-body fixing bracket is made of an insulating material, and the vehicle-body-side bracket is made of an insulating material or a metal material.

The shock absorbing apparatus may further include a vehicle-body fixing bracket provided between the vehicle-body-side bracket and the vehicle body in such a way to be coupled at a first end thereof to the vehicle-body-side bracket and at a second end thereof to the vehicle body.

The vehicle-body fixing bracket is made of an insulating material, and the vehicle-body-side bracket is made of an insulating material or a metal material.

A bumper-side bracket is provided on each of opposite ends of the bumper-side pipe to be coupled to the bumper while surrounding the opposite ends of the bumper-side pipe, and each of the bumper-side bracket and the vehicle-body-side bracket extends at the opposite ends thereof vertically, an extended portion being secured to each of the bumper and the vehicle-body fixing bracket in such a way as to be spaced apart from the bumper-side pipe and the vehicle-body-side pipe by a predetermined distance.

As is apparent from the above description, the shock absorbing apparatus for the vehicle is advantageous in that no permanent magnet is used to generate a repulsive force, thus significantly contributing to a reduction in weight.

Further, the shock absorbing apparatus for the vehicle is advantageous in that the repulsive force is generated only when necessary, so that it is possible to prevent unnecessary power consumption.

Furthermore, the shock absorbing apparatus for the vehicle is advantageous in that the intensity of the generated repulsive force can be changed depending on the deformed degree of the bumper, thus being capable of appropriately responding to shocks.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
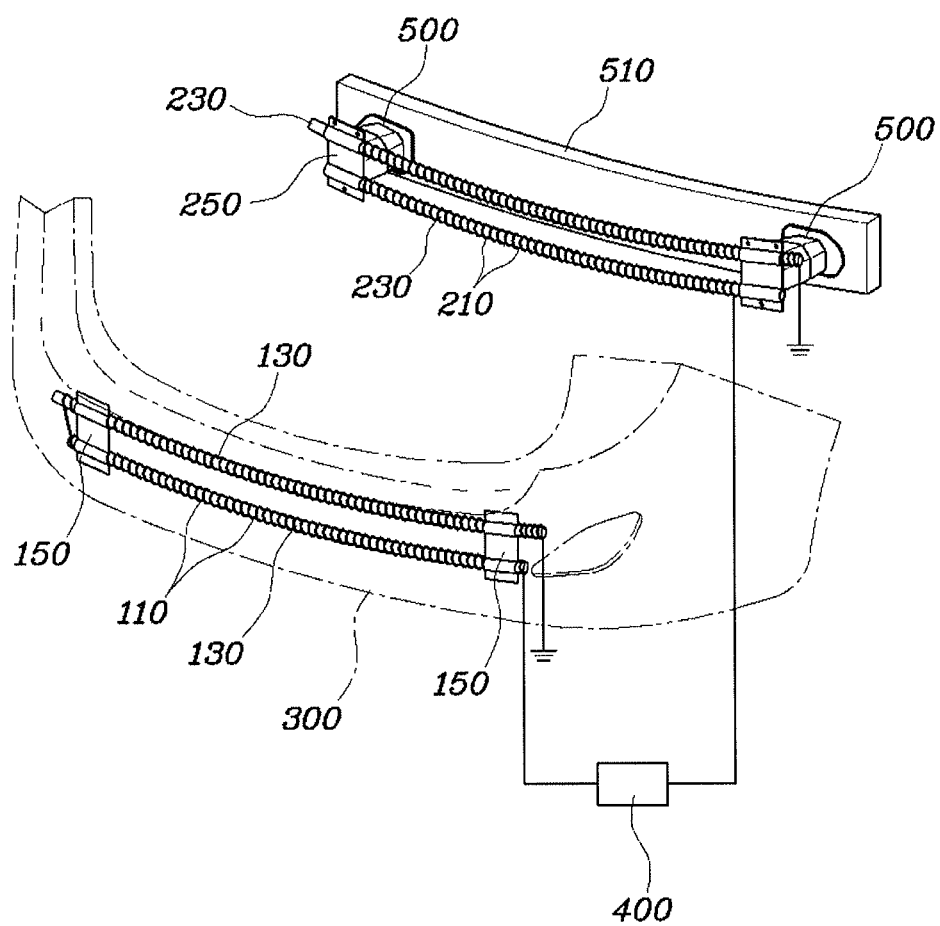
FIG. 1 is a view showing the configuration of a shock absorbing apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, a shock absorbing apparatus for a vehicle according to the preferred embodiment of the present invention will be described with reference to the accompanying drawings.

FIG. 1 is a view showing the configuration of a shock absorbing apparatus for a vehicle according to an exemplary embodiment of the present invention. The shock absorbing apparatus for the vehicle according to the exemplary embodiment of the present invention includes a first coil 110 provided in a bumper 300 of the vehicle, a second coil 210 provided on a vehicle body 510 in such a way as to face the first coil 110, and a control unit 400 that applies voltage to generate a repulsive force between the first and second coils 110 and 210 when a change in voltage is detected by a movement of the first coil 110 in the event of a vehicle collision, wherein an electric current flows between the control unit 400 and the first and second coils 110 and 210.

To be more specific, a bumper-side pipe 130 is provided in the bumper 300 of the vehicle in a longitudinal direction of the bumper 300, while a vehicle-body-side pipe 230 is provided on the vehicle body 510 in such a way as to face the bumper-side pipe 130. Further, the bumper-side pipe 130 includes a plurality of bumper-side pipes which are provided on the bumper 300 to be disposed one above the other, and the vehicle-body-side pipe 230 includes a plurality of vehicle-body-side pipes which are provided on the vehicle body 510 to be disposed one above the other. In this embodiment, a configuration having two bumper-side pipes 130 and two vehicle-body-side pipes 230 will be described. The number of each of the bumper-side pipe 130 and the vehicle-body-side pipe 230 may be one, or two or more.

Here, the bumper 300 refers to a bumper cover that is exposed to an outside. Bumper-side brackets 150 are provided on opposite ends of the bumper-side pipe 130 to be coupled to the bumper 300 while surrounding the opposite ends of the bumper-side pipe 130, thus allowing the bumper-side pipe 130 to be secured to the bumper 300. Vehicle-body-side brackets 250 are provided on opposite ends of the vehicle-body-side pipe 230 to be coupled to the vehicle body 150 while surrounding the opposite ends of the vehicle-body-side pipe 230.

The bumper-side bracket 150 and the vehicle-body-side bracket 250 may be bolted to the bumper 300 and the vehicle body 510, respectively. However, a fastening method is not limited thereto.

A vehicle-body fixing bracket 500 is further provided between the vehicle-body-side bracket 250 and the vehicle body 510 in such a way to be coupled at one end thereof to the vehicle-body-side bracket 250 and at the other end thereof to the vehicle body 510.

Here, the vehicle body 510 includes both a vehicle body frame located to face the bumper 300 and a structure secured to the vehicle body frame.

In other words, the vehicle-body-side pipe 230 is surrounded by the vehicle-body-side bracket 250 to be secured, and the vehicle-body-side bracket 250 is secured to the vehicle-body fixing bracket 500. The vehicle-body-side bracket 250 may be secured by pressurizing the vehicle-body-side pipe 230. The vehicle-body-side bracket 250 may be secured to the vehicle-body fixing bracket 500 by bolting. However, other securing methods may be possible.

Further, the vehicle-body fixing bracket 500 is preferably made of metal. In this case, the vehicle-body-side bracket 250 is made of an insulating material, for example, plastics so that an electric current does not flow between the vehicle-body-side pipe 230 and the vehicle body 510. Since the vehicle-body-side bracket 250 surrounds each of the opposite ends of the vehicle-body-side pipe 230, a current flow can be prevented between the vehicle-body-side pipe 230 and the vehicle body 510 although the vehicle-body fixing bracket 500 is made of metal. The vehicle-body-side bracket 250 may be made of insulating materials other than plastics.

Moreover, the vehicle-body fixing bracket 500 may be made of an insulating material, and the vehicle-body-side bracket 250 may be made of metal or an insulating material. In this context, the insulating material may be made of plastics.

Therefore, insulation is realized between the vehicle-body-side pipe 230 and the vehicle body 510, thus preventing a malfunction due to an electric current that flows through the vehicle body 510.

Alternatively, the vehicle-body-side bracket 250 does not surround the vehicle-body-side pipe 230, but may be coupled to the vehicle-body fixing bracket 500 while covering each of the opposite ends of the vehicle-body-side pipe 230 on a front of the vehicle-body-side pipe 230. That is, the vehicle-body-side bracket 250 is coupled to the vehicle-body fixing bracket 500 in such a way that the front of the vehicle-body-side pipe 230 is covered by the vehicle-body-side bracket 250, and the rear thereof is supported by the vehicle-body fixing bracket 500. Here, the vehicle-body fixing bracket 500 is made of an insulating material, and besides, the vehicle-body-side bracket 250 is made of metal or an insulating material, so as to prevent an electric current from flowing to the vehicle body 510.

In addition, each of the bumper-side bracket 150 and the vehicle-body-side bracket 250 extends at opposite ends thereof vertically, and an extended portion is bolted to each of the bumper 300 and the vehicle-body fixing bracket 500. The extended portion is fastened to each of the bumper 300 and the vehicle-body fixing bracket 500 in such a way as to be spaced apart from each of the bumper-side pipe 130 and the vehicle-body-side pipe 230 by a predetermined distance, thus preventing an electric current from flowing to the vehicle body 510.

The first coil 110 is wound around an outer circumference of the bumper-side pipe 130 in a longitudinal direction of the bumper-side pipe 130. The second coil 210 is wound around an outer circumference of the vehicle-body-side pipe 230 in a longitudinal direction of the vehicle-body-side pipe 230.

The first coils 110 and the second coils 210 are individually wound around the plurality of bumper-side pipes 130 and the plurality of vehicle-body-side pipes 230. The first and second coils 110 and 210 may be configured so that the first coils 110 wound around the respective bumper-side pipes 130 are connected to each other and the second coils 210 wound around the respective vehicle-body-side pipes 230 are connected to each other. Further, the coils independently wound around the respective pipes may be subjected to power from the control unit 400. Preferably, upper and lower coils wound around the respective pipes may have different winding directions. By doing so, it is possible to prevent a repulsive force from being generated in a vertical direction when power is applied.

Further, the first and second coils 110 and 210 are preferably wound around the bumper-side pipe 130 and the vehicle-body-side pipe 230, respectively, in such a way that facing coils are wound in the same direction. This allows a magnetic force to be generated in the same direction when power is applied to each of the first and second coils 110 and 210, so that a repulsive force can be generated between the first and second coils 110 and 210.

The bumper-side pipe 130 and the vehicle-body-side pipe 230 are located to face each other. Thus, if power is applied to each coil in the event of a collision, a repulsive force is generated from the front to the rear of the vehicle, thus enabling shocks to be effectively absorbed.

As the bumper 300 and the vehicle body 500 are provided with the plurality of pipes and coils, the intensity of a generated repulsive force can be increased. The reason is as follows: the more the wound coils are, the larger a magnetic force is.

Figure 2A:
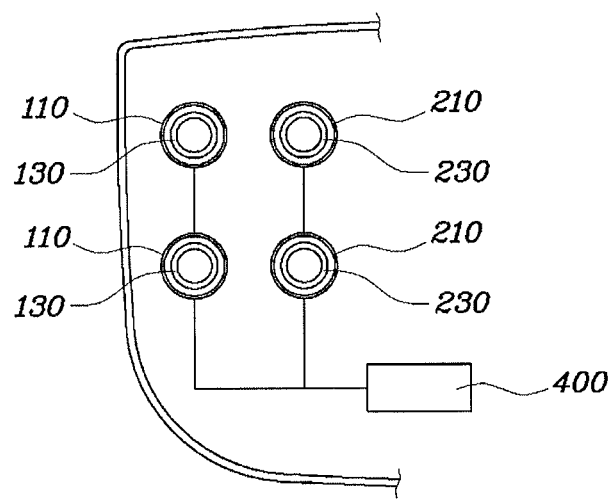
FIGS. 2A and 2B are views showing an operation of the shock absorbing apparatus for the vehicle according to the exemplary embodiment of the present invention, in the event of a vehicle collision.
Figure 2B:
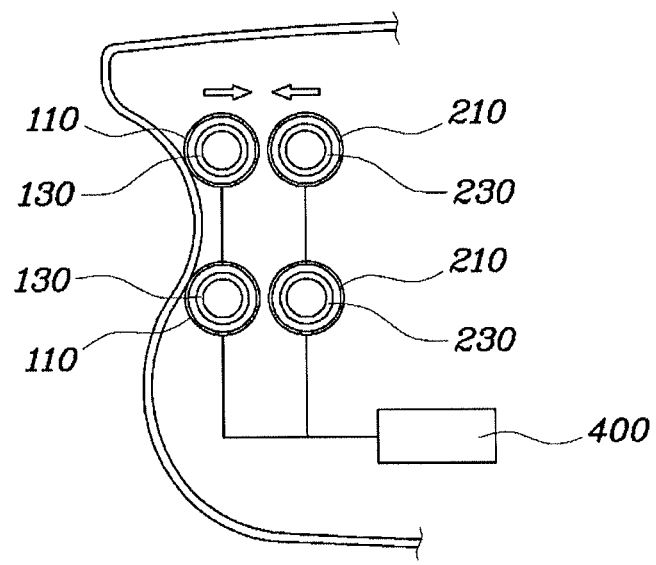

FIGS. 2A and 2B are views showing an operation of the shock absorbing apparatus, in the event of a vehicle collision. The shock absorbing apparatus maintains the state of FIG. 2A, at normal times. But, in the event of a vehicle collision, the bumper 300 is deformed as shown in FIG. 2B. As the bumper 300 is bent towards the rear of the vehicle, the bumper-side pipe 130 and the first coil 110 move towards the vehicle-body-side pipe 230 and the second coil 210. As two pipes around which the coils are wound approach each other, a first induced electromotive force is generated in each coil. Such a first induced electromotive force is applied to the control unit 400, so that the control unit 400 perceives the occurrence of the collision.

After the first induced electromotive force is applied, the control unit 400 applies base power to magnetize the first and second coils 110 and 210. Since the first and second coils 110 and 210, which are magnetized by the base power to be electromagnets, have the same polarity at their facing portions, a repulsive force is generated between the first and second coils 110 and 210.

If the first coil 110 approaches the second coil 210 due to the deformation of the bumper 300 in the state where the first and second coils 110 and 210 become the electromagnets, the first and second coils 110 and 210 come near to each other while overcoming the repulsive force. Consequently, a second induced electromotive force is generated. The second induced electromotive force becomes a voltage change value.

In other words, the voltage change value is the intensity of the second induced electromotive force generated by the magnetized first and second coils 110 and 210. Since the second induced electromotive force is increased or reduced in proportion to the moving speed of the magnetized first coil 110, it is noted that the voltage change value is changed depending on the speed in the event of a vehicle collision.

The reason why the voltage change value is not calculated directly using the first induced electromotive force but the second induced electromotive force is generated by the application of the base power is because the voltage is slightly generated only when using the first induced electromotive force and thus it is difficult to detect a change in voltage depending on a vehicle speed in the event of a vehicle collision. That is, in order to subdivide the vehicle speed in the event of the vehicle collision and detect the induced electromotive force corresponding to each vehicle speed, it is necessary to increase the intensity of the induced electromotive force. For this purpose, the base power is applied to generate the second induced electromotive force.

When the voltage change value exceeds a preset change value, the control unit 400 applies the preset change value to the first or second coil 110 or 210 so that a repulsive force can be generated between the first and second coils 110 and 210. By establishing the preset change value as such, the generation of a repulsive force is avoided when shocks are not large. As a result, it is possible to prevent an unnecessary waste of energy.

Further, the control unit 400 is provided with map data having the voltage change value as an input value and the voltage value as an output value, thus changing the voltage value depending on a change in the voltage change value.

Depending on the collision speed of the vehicle, the moving speed of the bumper-side pipe 130 and the first coil 110 towards the vehicle-body-side pipe 230 and the second coil 210 due to the deformation of the bumper 300 is changed. The voltage change value generated by the induced electromotive force is also changed depending on the speed at which the first coil 110 approaches the second coil 210. Hence, a different voltage value is established depending on the voltage change value, so that it is possible to generate a different repulsive force depending on the collision speed.

For example, when comparing a collision of the vehicle driving at 30 kph with that of the vehicle driving at 60 kph, the speed at which the first coil 110 is moved by the deformation of the bumper 300 is faster in the latter case. In this case, since the coil approaching speed is faster, an induced electromotive force when the vehicle driving at 60 kph collides is larger than an induced electromotive force when the vehicle driving at 30 kph collides, thus generating a larger voltage change value. Therefore, an associated voltage value is previously set to generate a repulsive force which is required to absorb shocks when a vehicle driving at 30 kph or 60 kph collides, so that it is possible to generate a proper repulsive force depending on various speeds.

Instead of the map data having the voltage change value as the input value and the voltage value as the output value, the map data having the voltage change value as the input value and a vehicle speed as the output value may be calculated by experiments and then may be mapped to the control unit 400, and additional map data having the vehicle speed as the input value and the voltage value corresponding to the vehicle speed as the output value may be provided, thus generating a repulsive force suitable for absorbing shocks depending on the vehicle speed, in the event of a vehicle collision.

Further, when applying the voltage value, the control unit 400 may apply the same voltage value to the first and second coils 110 and 210, or may apply a voltage value to either of the first or second coil 110 or 210 to magnetize it, thus generating the repulsive force.

As described above, the present invention provides a shock absorbing apparatus for a vehicle, in which no permanent magnet is used to generate a repulsive force, thus significantly contributing to a reduction in weight.

Further, the present invention provides a shock absorbing apparatus for a vehicle, in which a repulsive force is generated only when necessary, so that it is possible to prevent unnecessary power consumption.

Furthermore, the present invention provides a shock absorbing apparatus for a vehicle, in which the intensity of a generated repulsive force can be changed depending on the deformed degree of a bumper, thus being capable of appropriately responding to shocks.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shock absorbing apparatus for a vehicle, comprising:
   a first coil provided in a bumper of the vehicle;
   a second coil provided on a vehicle body and facing the first coil; and
   a control unit applying voltage to generate a repulsive force between the first and second coils when a change in voltage is detected by a movement of the first coil in an event of a vehicle collision, wherein an electric current flows between the control unit and the first and second coils, and
   wherein the bumper has a first support around which the first coil is wound and the vehicle body has a second support around which the second coil is wound.

2. The shock absorbing apparatus as set forth in claim 1, wherein the first support includes a bumper-side pipe provided in the bumper of the vehicle in a longitudinal direction of the bumper, the first coil being wound around the bumper-side pipe.

3. The shock absorbing apparatus as set forth in claim 2, wherein the second support includes a vehicle-body-side pipe provided on the vehicle body and facing the bumper-side pipe, the second coil being wound around the vehicle-body-side pipe.

4. The shock absorbing apparatus as set forth in claim 3,
   wherein the bumper-side pipe comprises a plurality of bumper-side pipes which are provided on the bumper to be disposed one above the other respectively, and
   wherein the vehicle-body-side pipe comprises a plurality of vehicle-body-side pipes which are provided on the vehicle body to be disposed one above the other respectively.

5. The shock absorbing apparatus as set forth in claim 3, wherein the first coil and the second coil are wound around the bumper-side pipe and the vehicle-body-side pipe, respectively, in a same direction.

6. The shock absorbing apparatus as set forth in claim 1, wherein the control unit applies a preset voltage value to the first or second coil, when a voltage change value exceeds a preset change value.

7. The shock absorbing apparatus as set forth in claim 6, wherein the control unit is provided with map data having the voltage change value as an input value and the voltage value as an output value, thus changing the voltage value depending on a change in the voltage change value.

8. The shock absorbing apparatus as set forth in claim 1,
   wherein a first induced electromotive force is generated on the first and second coils as the first coil approaches the second coil in the event of the vehicle collision, and
   wherein the control unit applies base power to each of the first and second coils to allow the first and second coils to become an electromagnet when the first induced electromotive force is generated.

9. The shock absorbing apparatus as set forth in claim 8, wherein the control unit is operated to generate a second induced electromotive force on each of the first and second coils as the first coil that is the electromagnet approaches the second coil, the voltage change value being the second induced electromotive force.

10. The shock absorbing apparatus as set forth in claim 3, wherein a bumper-side bracket is provided on each of opposite ends of the bumper-side pipe to be coupled to the bumper while surrounding the opposite ends of the bumper-side pipe.

11. The shock absorbing apparatus as set forth in claim 3, wherein a vehicle-body-side bracket is provided on each of opposite ends of the vehicle-body-side pipe to be coupled to the vehicle body while surrounding the opposite ends of the vehicle-body-side pipe.

12. The shock absorbing apparatus as set forth in claim 3, wherein a vehicle-body-side bracket is provided on each of opposite ends of the vehicle-body-side pipe to be coupled to the vehicle body while covering the opposite ends of the vehicle-body-side pipe on a front of the vehicle-body-side pipe.

13. The shock absorbing apparatus as set forth in claim 11, further comprising:
- a vehicle-body fixing bracket provided between the vehicle-body-side bracket and the vehicle body in such a way to be coupled at a first end thereof to the vehicle-body-side bracket and at a second end thereof to the vehicle body.

14. The shock absorbing apparatus as set forth in claim 13, wherein the vehicle-body fixing bracket is made of a metal material, and the vehicle-body-side bracket is made of an insulating material.

15. The shock absorbing apparatus as set forth in claim 13, wherein the vehicle-body fixing bracket is made of an insulating material, and the vehicle-body-side bracket is made of an insulating material or a metal material.

16. The shock absorbing apparatus as set forth in claim 12, further comprising:
- a vehicle-body fixing bracket provided between the vehicle-body-side bracket and the vehicle body in such a way to be coupled at a first end thereof to the vehicle-body-side bracket and at a second end thereof to the vehicle body.

17. The shock absorbing apparatus as set forth in claim 16, wherein the vehicle-body fixing bracket is made of an insulating material, and the vehicle-body-side bracket is made of an insulating material or a metal material.

18. The shock absorbing apparatus as set forth in claim 13, wherein a bumper-side bracket is provided on each of opposite ends of the bumper-side pipe to be coupled to the bumper while surrounding the opposite ends of the bumper-side pipe, and each of the bumper-side bracket and the vehicle-body-side bracket extends at the opposite ends thereof vertically, an extended portion being secured to each of the bumper and the vehicle-body fixing bracket in such a way as to be spaced apart from the bumper-side pipe and the vehicle-body-side pipe by a predetermined distance.

\* \* \* \* \*